Dec. 23, 1924.
C. A. SCHMID
DOUGH WORKING DEVICE
Filed Nov. 20, 1922
1,520,602
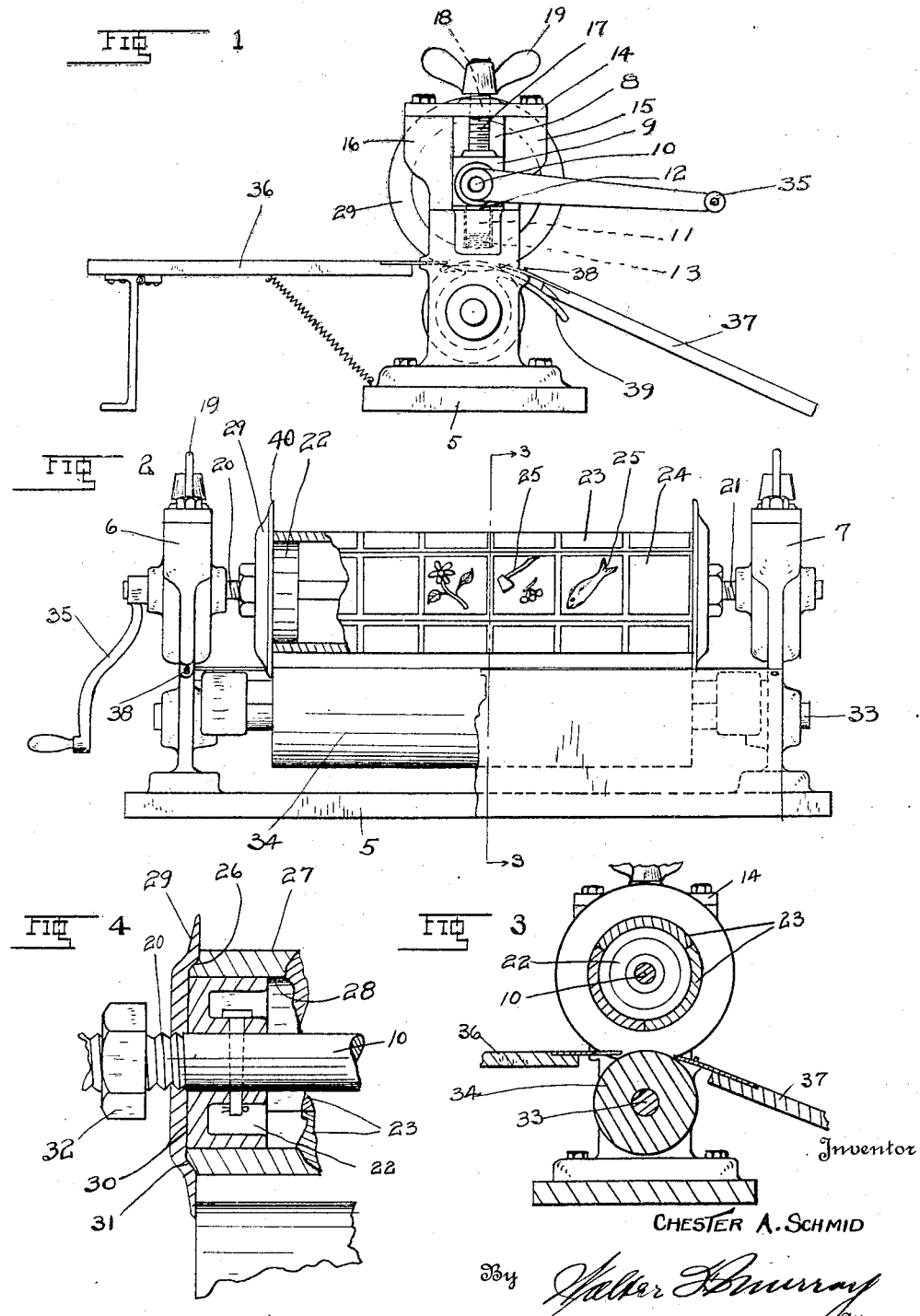
Inventor
CHESTER A. SCHMID Patented Dec. 23, 1924.

1,520,602

UNITED STATES PATENT OFFICE.

CHESTER A. SCHMID, OF CINCINNATI, OHIO.

DOUGH-WORKING DEVICE.

Application filed November 20, 1922. Serial No. 602,256.

*To all whom it may concern:*

Be it known that I, CHESTER A. SCHMID, a citizen of the United States of America, and a resident of Cincinnati, in the county of Hamilton and State of Ohio, have invented a new and useful Improvement in Dough-Working Devices, of which the following is a specification.

An object of my invention is to provide a simple and efficient device for rolling sheets of dough and for imprinting designs upon sheets of dough.

Another object of my invention is to provide a device wherein the impress plates may be readily interchanged.

Another object of my invention is to provide a device as stated that may be readily and thoroughly cleaned, and that will have no inaccessible pockets or crevices in which dough and the like may lodge.

These and other objects are attained by the means described herein and disclosed in the accompanying drawing in which—

Fig. 1 is a side elevation of a device embodying my invention.

Fig. 2 is an enlarged fragmental end elevation of the device shown in Fig. 1.

Fig. 3 is a sectional view on line 3—3 of Fig. 2.

Fig. 4 is an enlarged fragmental detailed view of parts of a device embodying my invention.

The base 5 carries at its opposite sides uprights of standards 6 and 7. The upper ends of the uprights are bifurcate whereby there is provided in each standard a way 8 in which is reciprocally contained a bearing block 9 supporting a shaft 10. The way 8 communicates at its lower end with a bore 11 formed in the standard, and in which bore is reciprocally contained a cup or cap 12. A spring 13 is contained within the bore 11 and extends into the cup or cap 12. The cap 12 supports the bearing block 9. A plate 14 forms a closure for the upper end of the way 8 and is mounted upon the branches 15 and 16 formed at the upper end of the standard. A screw 17 extends adjustably through a threaded way 18 formed in the plate 14 and may be adjusted vertically through the way 14 by means of the wing nut 19 carried by the screw 17 at its upper end. The spring 13 yieldingly retains the bearing block in engagement upon the end of the screw 17. The shaft 10 is threaded intermediate its ends as shown at 20 and 21. The shaft also carries circular blocks 22 upon which the segments 23 of the upper roller 24 are mounted. The segments 23 carry suitable recesses or projections 25 wherewith to impart various forms upon dough to be worked upon by the roller. The ends of the segments 23 are offset whereby to provide angular shoulders 26 intermediate the outer and inner faces 27 and 28 respectively of the segment plates 23. A disklike plate 29 is loosely mounted upon a shaft 10 and has formed in it a circumferential pocket 30 adapted to receive the inner ends of the plates 23, and also has formed on it a shoulder 31, complementary to the shoulder 26 formed on the plates. Nuts 32 mounted upon the threaded portions 20 and 21 of the shaft 10 are adapted to clamp the disklike plates upon the blocks 22 and to clamp the plates 23 in position.

A second shaft, 33 extending between the standards 6 and 7 and revolubly mounted thereupon, carries a roller 34 of a length such that it will enter between the plates 29 when the plates 29 are clamped upon the plates 23. Rotatory motion may be imparted to the shaft by any suitable means, such as a hand crank 35. A table 36 mounted on one side of the device is adapted to have dough placed upon it, and from which dough may be fed to the rollers 24 and 34. A receiving board or tray 37 is removably mounted upon hooks or pins 38 mounted upon the standards, and is adapted to receive dough from the rollers. Guards 39 are mounted between the standards adjacent the lower roller 34 and are adapted to receive dough that may be trimmed from the sheet of dough passing between the rollers. The sheet of dough passing between the rollers is trimmed by the cutting or trimming edge 40 formed on the circular plates or discs 29.

The operation of my device is as follows:

A sheet or mass of dough is placed upon the table 36. This dough is fed between the rollers while the rollers are revolved by means of the crank 35. The rollers form the dough to a thickness determinable by the distance at which the rollers are spaced, the upper roller imprinting various designs such as 25 upon dough. The discs 29 trim the edges of the dough, and the trimmed and imprinted sheet of dough passes on to the receiving tray 37. The adjustment of the rollers is obvious. When it is desired to change the segments of the upper roller, the nuts 32 are turned upon the shaft 10 and moved outwardly thereof whereby to release the discs 29 from clamping engagement on the segments, whereupon the segments may be withdrawn and other segments be mounted upon the circular block 32. By reference to Fig. 4 it will be readily apparent that the only crevice into which dough might enter is that between the segments and between the segments and the discs 29. These several parts being so readily removable and interchangeable makes it possible to keep the device clean and sanitary with a minimum of effort and also permits thorough cleaning, affording no inaccessible pockets.

What I claim is:

1. In a device of the class described the combination of a pair of spaced standards, a pair of spaced shafts revolubly mounted upon and extending between the standards, a roller mounted on one of the standards, blocks mounted on the second shaft, roller segments mounted on the blocks, and discs mounted on the shaft clamping the roller segments upon the blocks, the discs extending outwardly beyond the roller segments and providing flanges between which the first mentioned roller may extend.

2. In a device of the class described the combination of a pair of spaced standards, a shaft revolubly mounted upon and extending between the standards, the shaft having screw threads formed adjacent its ends, blocks mounted upon the shaft, roller segments mounted on the blocks and having shoulders at their ends, discs mounted on the shaft adjacent the threaded portions, the discs having recesses formed in them adapted to receive the shoulders on the roller segments, nuts mounted on the threaded portions of the shaft adapted to clamp the discs and the roller segments between one another, means to impart rotatory motion to the shaft, and a second roller revolubly supported by the standards adapted to extend between the discs when secured in clamping position by the nuts.

In testimony whereof, I have hereunto subscribed my name this 14th day of November, 1922.

CHESTER A. SCHMID.